(12) United States Patent
Karan

(10) Patent No.: US 8,133,342 B2
(45) Date of Patent: Mar. 13, 2012

(54) METHOD OF FABRICATING INK JET LABEL STOCK

(75) Inventor: Aharon A. Karan, Milwaukee, WI (US)

(73) Assignee: Kenco® Label & Tag Co., LLC, Milwaukee, WI (US)

( * ) Notice: Subject to any disclaimer, the term of this patent is extended or adjusted under 35 U.S.C. 154(b) by 60 days.

(21) Appl. No.: 12/468,639

(22) Filed: May 19, 2009

(65) Prior Publication Data

US 2010/0294425 A1 Nov. 25, 2010

(51) Int. Cl.
*B32B 37/02* (2006.01)
*B32B 38/04* (2006.01)

(52) U.S. Cl. ............... 156/253; 156/270; 156/64

(58) Field of Classification Search ........... 156/253, 156/270, 271, 259, 64
See application file for complete search history.

(56) References Cited

U.S. PATENT DOCUMENTS

| | | | | |
|---|---|---|---|---|
| 2,725,644 A * | 12/1955 | Wade et al. | ............ | 434/327 |
| 3,166,186 A * | 1/1965 | Karn | ............ | 428/42.3 |
| 4,299,637 A * | 11/1981 | Oberdeck et al. | ............ | 156/64 |
| 5,560,293 A * | 10/1996 | Boreali et al. | ............ | 101/288 |
| 6,142,049 A * | 11/2000 | Schweitzer et al. | ............ | 83/349 |
| 6,626,343 B2 * | 9/2003 | Crowley et al. | ............ | 226/31 |
| 7,150,573 B2 | 12/2006 | Cummins et al. | | |
| 2002/0047263 A1* | 4/2002 | McCarthy et al. | ............ | 283/107 |
| 2005/0118378 A1* | 6/2005 | Downs | ............ | 428/42.3 |

* cited by examiner

*Primary Examiner* — Linda L Gray
(74) *Attorney, Agent, or Firm* — Boyle Fredrickson, S.C.

(57) ABSTRACT

A method is provided of fabricating ink jet labels. The method includes the step of providing a web of tag stock paper. The web has first and second sides. A web of ink jet stock paper is provided. The ink jet stock paper has a first side coated with an ink jet coating and a second side. The second side of the ink jet stock paper is laminated to the first side of the tag stock paper to provide a web of label stock.

14 Claims, 3 Drawing Sheets

METHOD OF FABRICATING INK JET LABEL STOCK

FIELD OF THE INVENTION

This invention relates generally to ink jet printers, and in particular, to a method of fabricating ink jet label stock for use in conjunction with an ink jet label printer for printing photo quality tags.

BACKGROUND AND SUMMARY OF THE INVENTION

As is known, ink jet printing is a non-impact printing technique in which droplets of ink are ejected through fine nozzles or orifaces in a printhead onto a substrate, such a web of stock material, without bringing the nozzles into contact with the substrate. The ink droplets land on the substrate thereby printing user-desired information there. For higher quality, higher resolution printing applications, the number of orifices in the printhead is increased and the diameter of such orifices is reduced in size. Consequently, for full color printed images, inks have been developed that include dyes and/or pigments and various carriers and/or solvents which are resistant to drying or otherwise clogging the orifices in the printhead. These modified inks require longer drying times and/or are prone to color mixing or bleeding, thereby resulting in poorer quality images.

In order to limit the color mixing or bleeding associated with these modified ink formulations, specialty papers incorporating exotic coatings have been developed. These specialty papers are fabricated using conventional paper making techniques wherein a fibrous pulp is deposited on a wire screen and dried to form a web. The web includes minute pores or voids between the cellulosic fibers for absorption of liquids therein. The coating is depositing on the web to change the porosity and the hydrophilic properties of the web. As a result, the coated web has the ability to absorb or repel aqueous and/or organic fluids which may be used as carrier fluids in the ink formulations.

Heretofore, ink jet label printers have been developed that allow a user to print information, such as bar codes, on coated, adhesive backed labels. More specifically, blank adhesive labels are carried on a flexible web from a supply roll that is fed through the ink jet label printer wherein the desired information is printed thereon. It can be appreciated that it would be often desirable to use the ink jet label printer for printing on tag stock to provide photo quality tags. However, coated tag stock is not readily available due to the costs associated with manufacturing the product. Hence, it is highly desirable to provide a simple and inexpensive method of fabricating coated label stock for use in conjunction with an ink jet label printer so as to allow a user to print photo quality tags.

Therefore, it is a primary object and feature of the present invention to provide a method of fabricating ink jet label stock for use in conjunction with an ink jet label printer.

It is a further object and feature of the present invention to provide a method of fabricating ink jet label stock for use in conjunction with an ink jet label printer that is simple and inexpensive to perform.

It is a still further object and feature of the present invention to provide a method of fabricating ink jet label stock for use in conjunction with an ink jet label printer that allows a user to print photo quality tags.

In accordance with the present invention, a method is provided of fabricating ink jet labels. The method includes the step of providing a web of tag stock paper. The web has first and second sides. A web of ink jet stock paper is provided. The ink jet stock paper has a first side coated with an ink jet coating and a second side. The second side of the ink jet stock paper is laminated to the first side of the tag stock paper to provide a web of label stock.

The second side of ink jet paper includes an adhesive thereon and method may include the additional step of printing a plurality of spaced registration marks on the second side of the web of tag stock paper. The web of label stock has first and second edges and the method may include the additional step of die cutting a plurality of spaced perforations in the label stock. Each perforation is disposed on a corresponding registration mark. In addition, each perforation is transverse to the first edge of the web of label stock. The web of label stock may be cut between the first and second edges to define a web of labels. The web of labels has a predetermined width. Thereafter, a user may print information onto the first side of the ink jet stock paper.

In accordance with a further aspect of the present invention, a method is provided of fabricating ink jet labels. The method includes the step of laminating a second side of a web of ink jet stock paper to a first side of a web of tag stock paper to provide a web of label stock. A plurality of spaced registration marks is printed on a second side of the web of tag stock paper. Perforations are die cut in the web of label stock.

A first side of the web of ink jet stock paper is coated and the second side of the web of ink jet paper includes an adhesive thereon. Each perforation is disposed on a corresponding registration mark. The web of label stock has first and second edges. Each perforation is transverse to the first edge of the web of label stock. The method may also include the additional step of cutting the web of label stock between the first and second edges to define a web of labels. The web of labels has a predetermined width. Thereafter, a user may print information onto the first side of the ink jet stock paper.

In accordance with a still further aspect of the present invention, a method of fabricating ink jet labels. The method includes the step of laminating a second side of a web of ink jet stock paper to a first side of a web of tag stock paper to provide a web of label stock. A plurality of perforations is die cut in the web of label stock. Thereafter, the first side of the ink jet stock paper is printed upon.

The first side of the ink jet stock paper is coated and the web of label stock has first and second edges. The method may include the additional step of cutting the web of label stock between the first and second edges to define a web of labels. The web of labels has a predetermined width. A second side of the web of tag stock paper includes a plurality of registration marks. Each registration mark is aligned with a corresponding perforation and is transverse to the first edge of the web of label stock.

BRIEF DESCRIPTION OF THE DRAWINGS

The drawings furnished herewith illustrate a preferred construction of the present invention in which the above advantages and features are clearly disclosed as well as other which will be readily understood from the following description of the illustrated embodiment.

In the drawings.

DETAILED DESCRIPTION OF THE DRAWINGS

Figure 1:
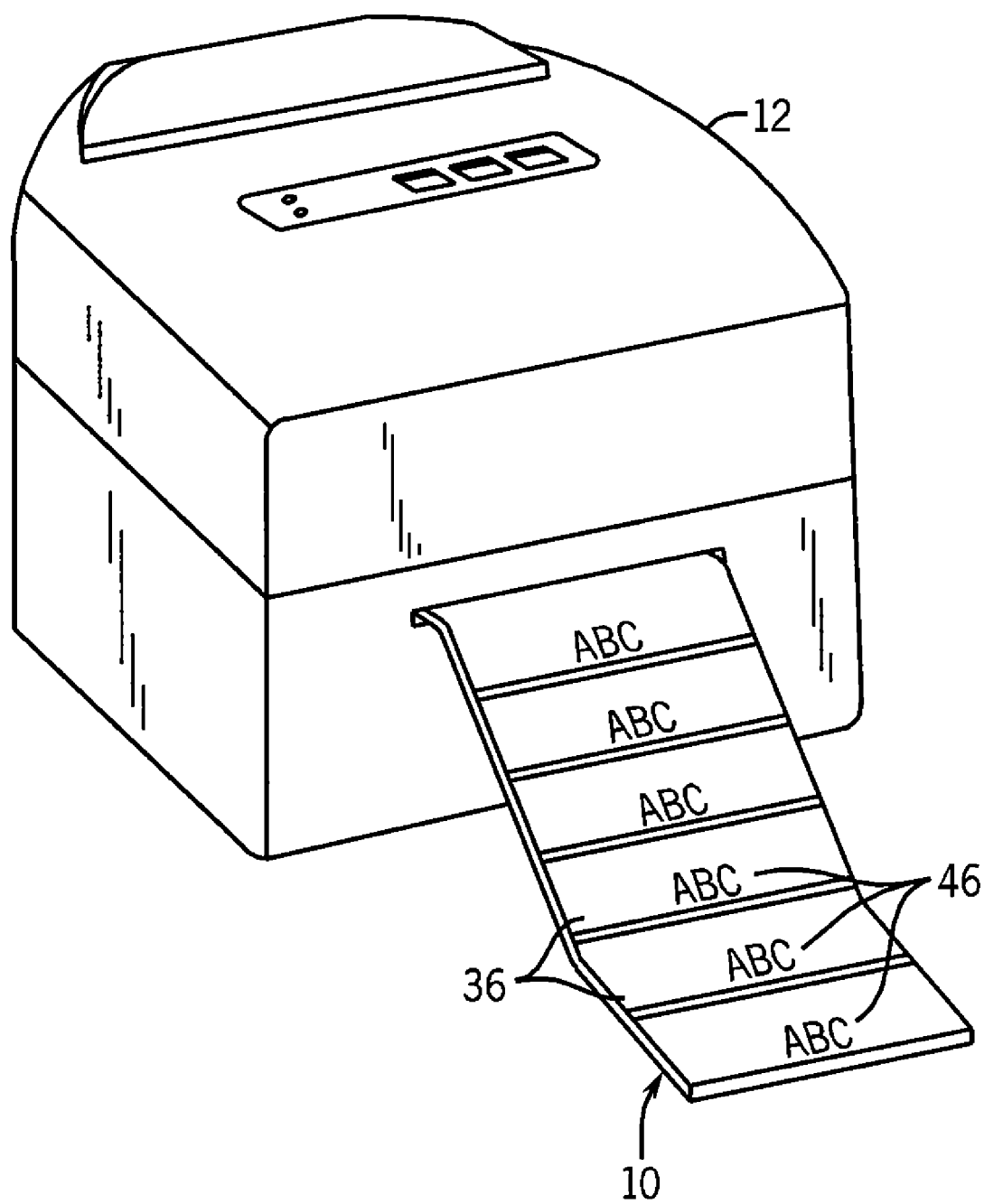
FIG. 1 is an isometric view of a conventional label printer printing labels fabricated in accordance with the methodology of the present invention.
Figure 2:
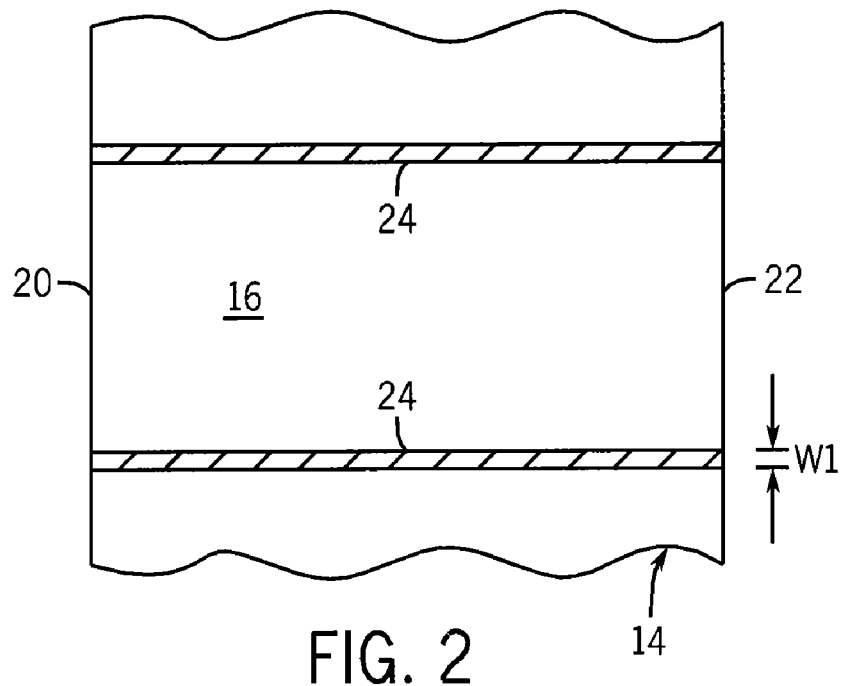
FIG. 2 is a top plan view showing tag stock for use in the methodology of the present invention.
Figure 4:
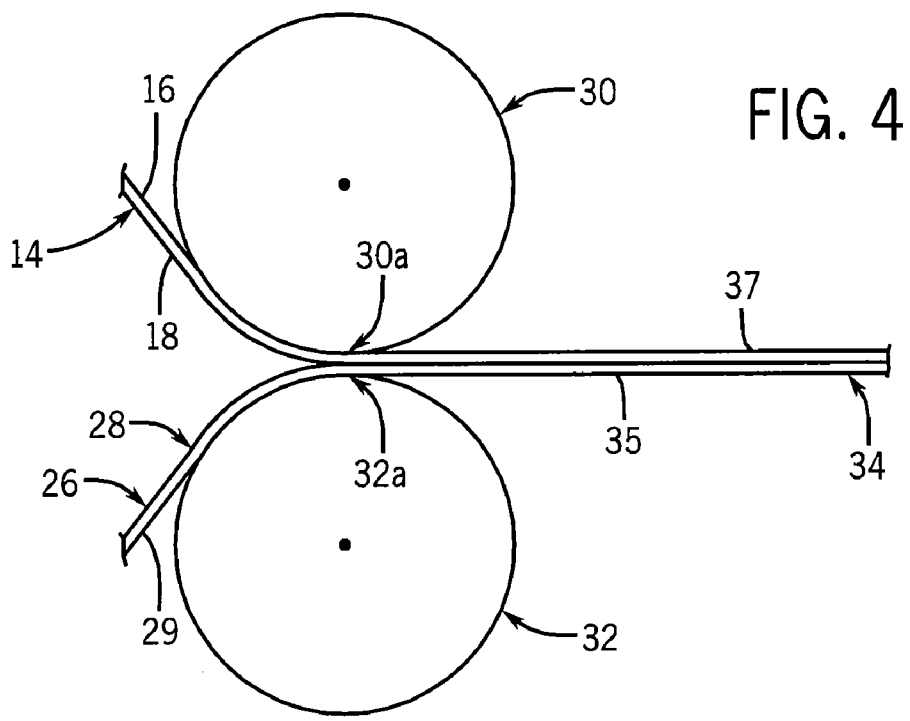
FIG. 4 is a schematic, side elevational view showing an initial step of the methodology of fabricating ink jet label stock in accordance with the present invention.

Referring to FIGS. 1-2 and 4, a first web of ink jet label stock fabricated in accordance with the methodology of the present invention is generally designated by the reference 10. As hereinafter described, it is intended for first web of ink jet label stock 10 to be used in conjunction with a standard ink jet printer 12. In order to fabricate first web of ink jet label stock 10, tag stock 14 is provided. Tag stock 14 is defined by outer surface 16, inner surface 18, and first and second edges 20 and 22, respectively. First and second edges 20 and 22, respectively of tag stock 14 are generally parallel to each other. Registration marks 24 are printed on outer surface 16 of tag stock 14. By way of example, registration marks 24 may take the form of spaced stripes extending between first and second edges 20 and 22, respectively, of tag stock 14. It is contemplated for registration marks 24 to have a predetermined width W1. It can be appreciated that registration marks 24 may have other configurations without deviating from the scope of the present invention.

Figure 3:
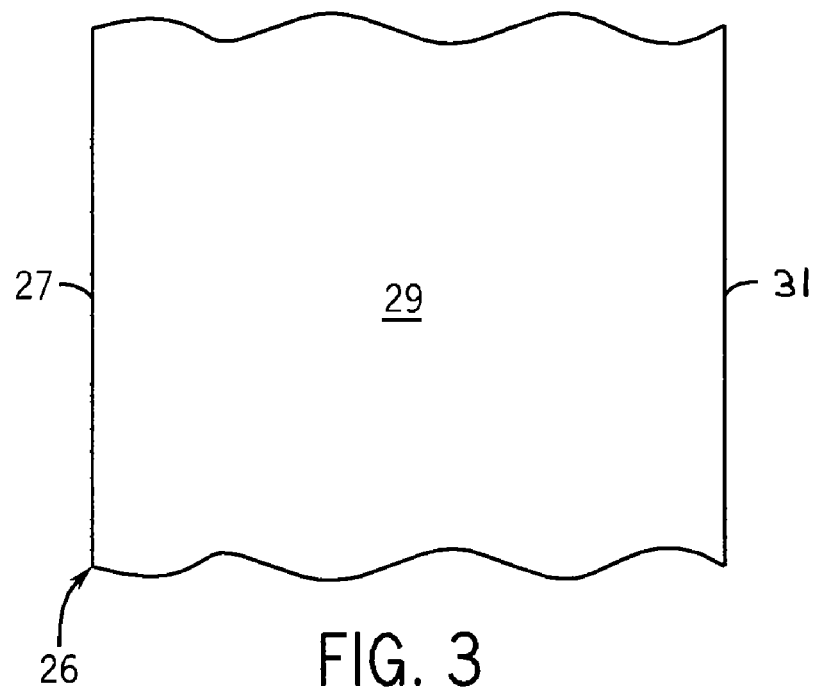
FIG. 3 is a top plan view showing ink jet coated stock for use in the methodology of the present invention.

As best seen in FIGS. 3-4, ink jet label stock 10 is also fabricated from ink jet coated stock, generally designated by the reference numeral 26. Ink jet coated stock 26 includes an inner surface 28 having adhesive or the like affixed thereto and an outer surface 29 coated with a conventional inkjet coating material to change the porosity and hydrophilic properties of the stock. As a result, outer surface 29 of ink jet coated stock 26 has the ability to absorb or repel aqueous and/or organic fluids which may be used as carrier fluids in various ink jet formulations. Ink jet coated stock 26 is further defined by first and second edges 27 and 29, respectively, that are generally parallel to each other.

As best seen in FIG. 4, in order to laminate inner surface 18 of tag stock 14 to inner surface 28 of ink jet coated stock 26, tag stock 14 and ink jet coated stock 26 are aligned such that first edge 20 of tag stock 14 is aligned with first edge 27 of ink jet coated stock 26 and such that second edge 22 of tag stock 14 is aligned with second edge 31 of ink jet coated stock 26. The leading edges of tag stock 16 and ink jet coated stock 18 are positioned between the nip points 30a and 32a of corresponding rollers 30 and 32, respectively. Rollers 30 and 32 are heated to a desired level, and thereafter, actuated such that tag stock 16 and ink jet coated stock 18 are fed between nip points 30A and 32A of rollers 30 and 32, respectively, thereby laminating inner surface 18 of tag stock 14 to inner surface 28 of ink jet coated stock 26 and forming raw ink jet label stock 34. Rollers 30 and 32 continue to rotate until all of tag stock 14 and/or ink jet coated stock 26 passes between nip portions 30a and 32a of rollers 30 and 32, respectively. It can be appreciated that the above describes one possible process for laminating tag stock 14 and ink jet coated stock 26 together. However, other lamination processes are possible as being within the scope of the present invention.

Figure 5:
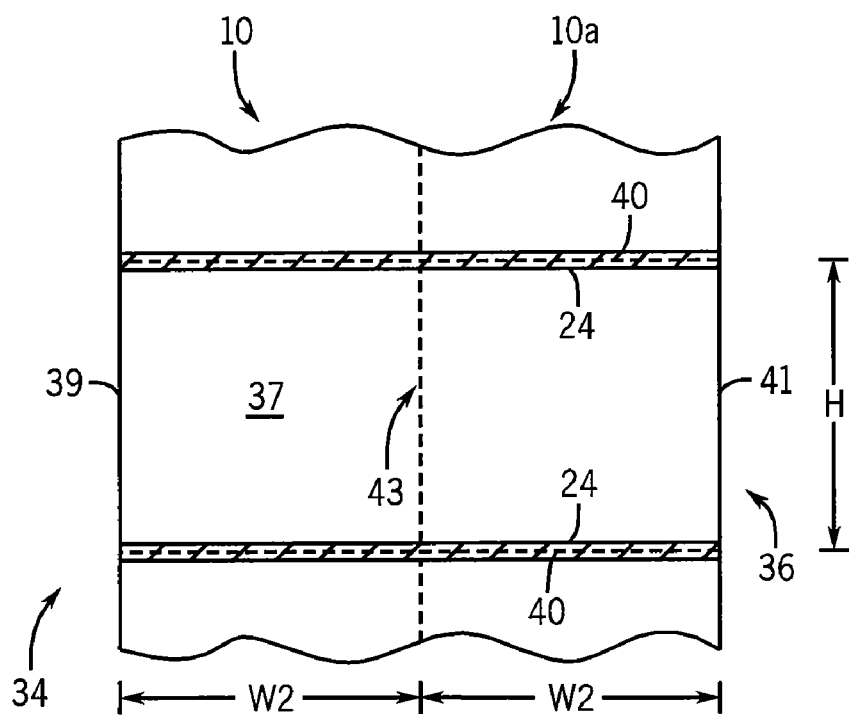
FIG. 5 is a bottom plan view showing raw ink jet label stock fabricated in accordance with the methodology of the present invention.

Referring to FIGS. 4-5, raw ink jet label stock 34 is defined by coated surface 35 corresponding to outer surface 29 of inkjet coated stock 26, registration surface 37 corresponding to outer surface 16 of tag stock 14; first edge 39 corresponding to first edges 20 and 27 of tag stock 14 and ink jet coated stock 26, respectively; and second edge 41 corresponding to second edges 20 and 27 of tag stock 14 and ink jet coated stock 26, respectively. Once raw inkjet label stock 34 is fabricated, as heretofore described, it is contemplated to die cut raw ink jet label stock 34 to form first and second webs of ink jet label stock 10 and 10a, respectively, defined by a plurality of labels 36. More specifically, perforations 40 are die cut along registration marks 24 between first and second edges 39 and 41, respectively of raw inkjet label stock 34. Adjacent perforations 40 define heights H of labels 36, as hereinafter described. Once perforations 40 are die cut into raw ink jet label stock 34, raw ink jet label stock 34 is die cut along perforated line 43 so as to form first and second webs of ink jet label stock 10 and 10a, respectively. First and second webs of inkjet label stock 10 and 10a, respectively, have widths W2 corresponding to a user desired width of labels 36.

In operation, a user positions one of the webs of ink jet label stock, e.g., first web of ink jet label stock 10, within the input of a conventional ink jet printer 12, FIG. 1. As first web of inkjet label stock 10 is fed through ink jet label printer 12, user desired indicia 46 is printed on coated surface 35 of first web of the ink jet coated stock 10 between adjacent perforations 40. Registration marks 24 on registration surface 37 of first web of ink jet label stock 10 orientate first web of ink jet label stock 10 within ink jet label printer 12 so as to insure each indicia 46 is properly aligned on a corresponding label 36 between adjacent registration marks 24. Once the printing operation has been completed, each label 36 may be torn from first web of ink jet label stock 10 along perforation 40.

Various modes of carrying out the invention are contemplated as being within the scope of the following claims particularly pointing out and distinctively claiming a subject matter which applicant regards is the invention.

I claim:

1. A method of fabricating ink jet labels, comprising the steps of:
    providing a web of tag stock paper, the web having a first side and a second side free of adhesive;
    providing a web of ink jet stock paper, the ink jet stock paper having a first side coated with an ink jet coating and a second side;
    laminating the second side of the ink jet stock paper to the first side of the tag stock paper to provide a web of label stock;
    printing a plurality of spaced registration marks on the second side of the web of tag stock paper; and
    die cutting a plurality of sets of spaced perforations in the web of label stock, each set of spaced perforations being along and over a corresponding registration mark and extending through the entirety of the web of label stock.

2. The method of claim 1 wherein the second side of ink jet paper includes an adhesive thereon.

3. The method of claim 1 wherein:
    the web of label stock has first and second edges; and
    each perforation is transverse to the first edge of the web of label stock.

4. The method of claim 1 wherein the web of label stock has first and second edges and wherein the method includes the additional step of cutting the web of label stock between the first and second edges to define a web of labels, the web of labels having a predetermined width.

5. The method of claim 1 comprising the additional step of printing onto the first side of the ink jet stock paper.

6. A method of fabricating ink jet labels, comprising the steps of:
    laminating a second side of a web of ink jet stock paper to a first side of a web of tag stock paper to provide a web of label stock;
    printing a plurality of spaced registration marks on a second side of the web of tag stock paper, the second side of the web of tag stock being free of adhesive; and die cutting perforations in the web of label stock along and over corresponding spaced registration marks, the perforations extending through the entirety of the web of label stock.

7. The method of claim 6 comprising the additional step of coating a first side of the web of ink jet stock paper.

8. The method of claim 6 wherein the second side of the web of ink jet paper includes an adhesive thereon.

9. The method of claim 6 wherein:
the web of label stock has first and second edges; and
each perforation is transverse to the first edge of the web of label stock.

10. The method of claim 6 wherein the web of label stock has first and second edges and wherein the method includes the additional step of cutting the web of label stock between the first and second edges to define a web of labels, the web of labels having a predetermined width.

11. The method of claim 6 comprising the additional step of printing onto the first side of the ink jet stock paper.

12. A method of fabricating ink jet labels, comprising the steps of:
laminating a second side of a web of ink jet stock paper to a first side of a web of tag stock paper to provide a web of label stock, the first side of the web of ink jet stock paper being coated and the second side of the web of tag stock paper being free of adhesive;
printing a plurality of spaced registration marks on the second side of the web of tag stock paper;
die cutting a plurality of sets of perforations through the entirety of the web of label stock, the sets of perforations along and over corresponding spaced registration marks; and
printing onto the first side of the ink jet stock paper.

13. The method of claim 12 wherein the web of label stock has first and second edges and wherein the method includes the additional step of cutting the web of label stock between the first and second edges to define a web of labels, the web of labels having a predetermined width.

14. The method of claim 12 wherein:
the web of label stock has first and second edges; and
each perforation is transverse to the first edge of the web of label stock.

* * * * *